United States Patent [19]

Miyahara

[11] Patent Number: 5,170,295
[45] Date of Patent: Dec. 8, 1992

[54] PICTURE SIGNAL RECORDING METHOD AND SYSTEM THEREFOR

[75] Inventor: Keisuke Miyahara, Tokorozawa, Japan

[73] Assignee: TEAC Corporation, Tokyo, Japan

[21] Appl. No.: 551,890

[22] Filed: Jul. 12, 1990

[30] Foreign Application Priority Data

Jul. 18, 1989 [JP] Japan ................... 1-185710

[51] Int. Cl.⁵ .......................... H04N 5/78; G11B 5/02
[52] U.S. Cl. .................................... 360/11.1; 360/9.1; 360/27
[58] Field of Search ............... 360/11.1, 27, 72.2, 360/14.1, 14.2, 14.3, 313, 9.1; 358/136, 108

[56] References Cited

U.S. PATENT DOCUMENTS 4,150,397 4/1979 Russell ........................... 360/11.1
4,408,224 10/1983 Yoshida ........................... 358/108

Primary Examiner—Aristotelis Psitos
Assistant Examiner—Varsha V. Sheladia
Attorney, Agent, or Firm—Woodcock Washburn Kurtz Mackiewicz & Norris

[57] ABSTRACT

A record and playback system comprises a signal source such as a video camera, a recording apparatus such as a VTR, and a control circuit device connected between the signal source and the recording apparatus. The control circuit device sends one or a few frames selected from a plurality of still picture frames to the successive frames of a composite picture signal given from the signal source to the recording apparatus, as well as sends a signal showing the total time length of a number of still picture frames. As a result, it is possible to record much and various picture information on a small volume of a record medium.

11 Claims, 6 Drawing Sheets

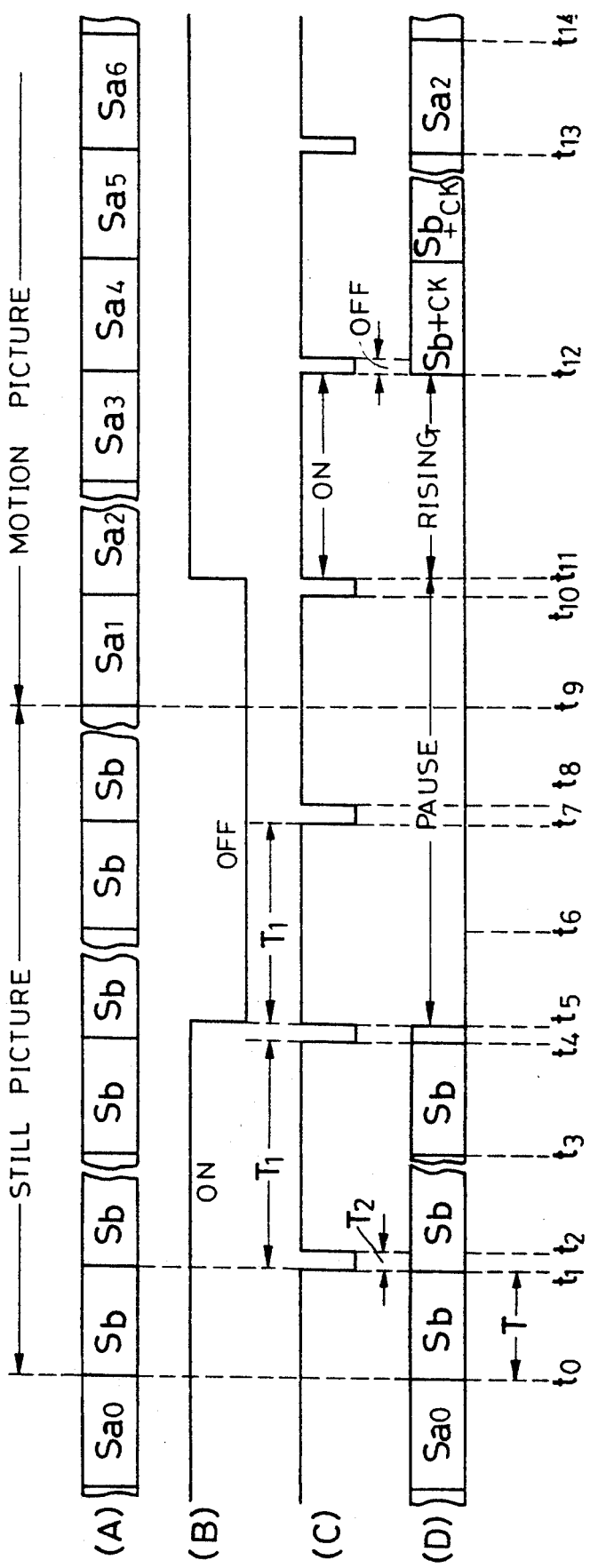

5,170,295

PICTURE SIGNAL RECORDING METHOD AND SYSTEM THEREFOR

BACKGROUND OF THE INVENTION

The present invention relates to a method and a system for recording picture signals or video signals on a record medium by using a video tape recorder or the similar device.

Image information can be recorded on a magnetic tape through a combination of a video camera and a video tape recorder. The video camera outputs a composite picture signal and the video tape recorder records the composite picture signal on the magnetic tape. The composite picture signal consists of picture signals and, horizontal and vertical synchronizing pulses. According to the National Television System Committee Rules, the composite picture signal consists of successive frames or a number of frames repeatedly arranged with periods of 1/30 seconds.

Anyway the recordable time or record time of composite picture signals of a single magnetic tape cassette to be used in the video tape recorder is limitted to, for example, one hours, two hours, and so on. When the output signals or composite picture signals of the video camera are recorded as they are on a magnetic tape by means of the video tape recorder, the length of the magnetic tape to be used or consumed corresponds to the operation time of the video camera. That is, even when the video camera takes still fields or still pictures, as far as the video camera functions, the composite picture signals are being sent to the video tape recorder and a number of identical frames are continuously recorded on the magnetic tape.

As a result, it is impossible to record image information used to monitor or prevent crimes and to survey such phenomena as volcanic actions for a long time period.

SUMMARY OF THE INVENTION

Accordingly it is the purpose of the present invention to provide a method and a system for extracting or sampling only the necessary frames from the frames of a picture signal produced by the video camera or the like and for recording the necessary frames of the picture signal on the record medium.

The recording method for a picture signal according to the present invention has a step for continuously or successively receiving or taking picture signal frames. The frames continuously taken aren't recorded as they are on the record medium. Particular frames are sampled from the frames continuously received at a predetermined interval. Next, the frame previously sampled and another frame afterward sampled are compared to each other in order to determined whether the former frame is substantially identical with the latter one or not. If the latter frame isn't identical substantially to the former frame, frames continuously received are recorded on the record medium. When the latter frame is substantially identical with the former frame, the frames continuously received or inputted aren't recorded, and, alternately, the previously sampled frame or the subsequently sampled frame is memorized in a memory. After that, when the latter frame becomes not identical with the former frame, the frame previously memorized or written in the memory is readout and written on the record medium. After the frame which is readout from the memory is finished to be memorized on the record medium, the frames continuously received are written on the record medium.

According to the preferred embodiment of the present invention, a signal showing the total time length of a plurality of frames respectively having the substantially identical contents and being contained in the input signals received are recorded on the record medium.

The above and other features and advantages of the invention and the manner of realizing them will become more apparent, and the invention itself will best be understood from a study of the following description and appended claims, with reference to the attached drawings showing the preferred embodiments of the present invention.

BRIEF DESCRIPTION OF THE DRAWINGS

FIG. 6(A)-(D), are diagrams an input signal received of FIG. 5, ON and OFF of the first and the second switches, and a frame arrangement on magnetic tapes.

DESCRIPTION OF THE PREFERRED EMBODIMENTS

Figure 1:
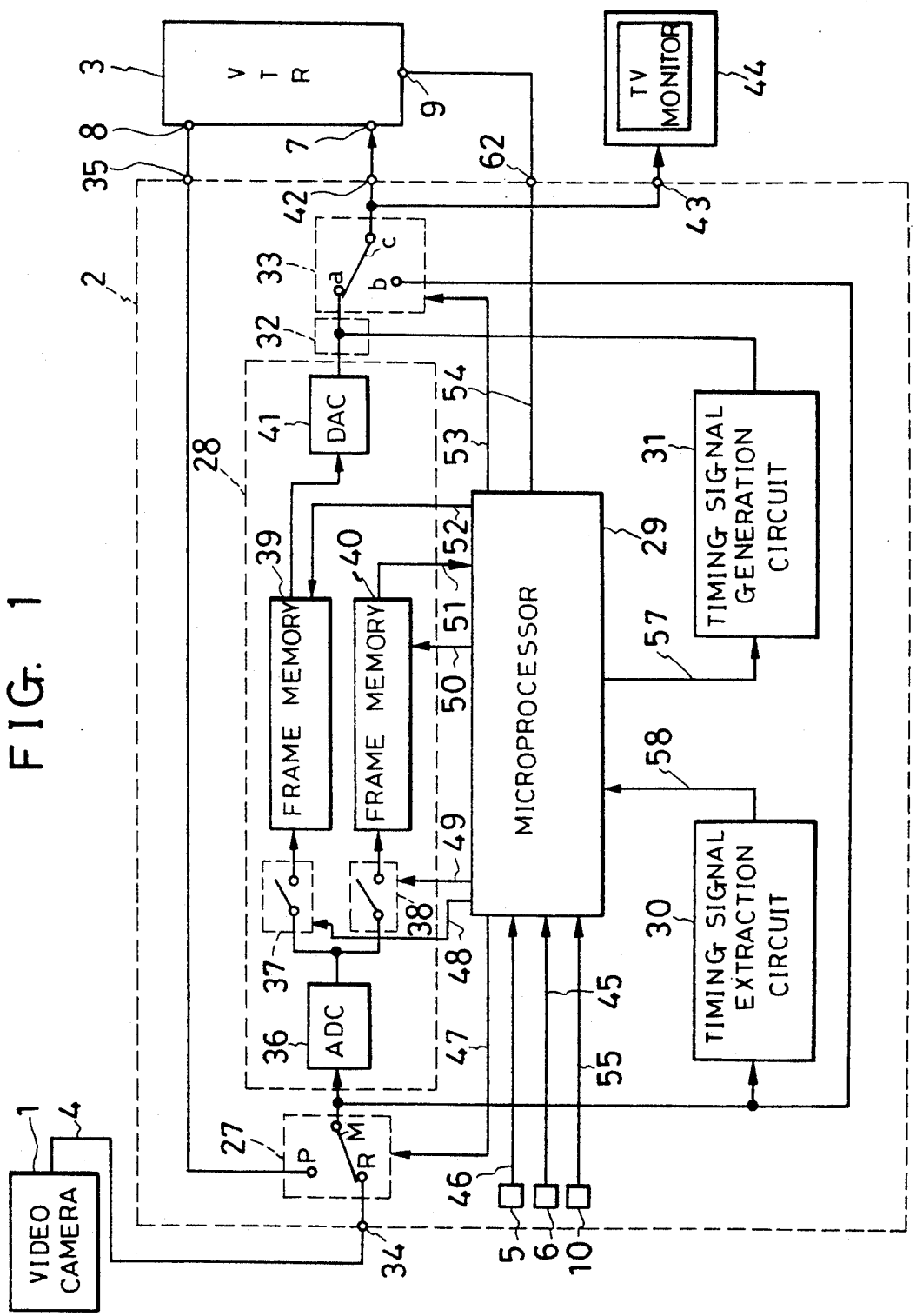
FIG. 1 is a block diagram depicting the picture signal record and reproduction system formed according to the first

The picture signal record and reproduction system according to the first preferred embodiment of the present invention is shown in FIG. 1. The record and reproduction or playback system for picture signals includes a video camera 1 functioned as a signal source of a picture signal, a record and reproduction control circuit apparatus 2 according to the present invention, and a video tape recorder 3 (hereinafter referred to as VTR) used as a record device.

The video camera 1 outputs the composite picture signal or composite video signal according to the NTSC rules and supplies to an output line 4.

VTR 3 has a record signal input terminal 7, a reproduction signal output terminal 8, and a remote control terminal 9.

Figure 2:
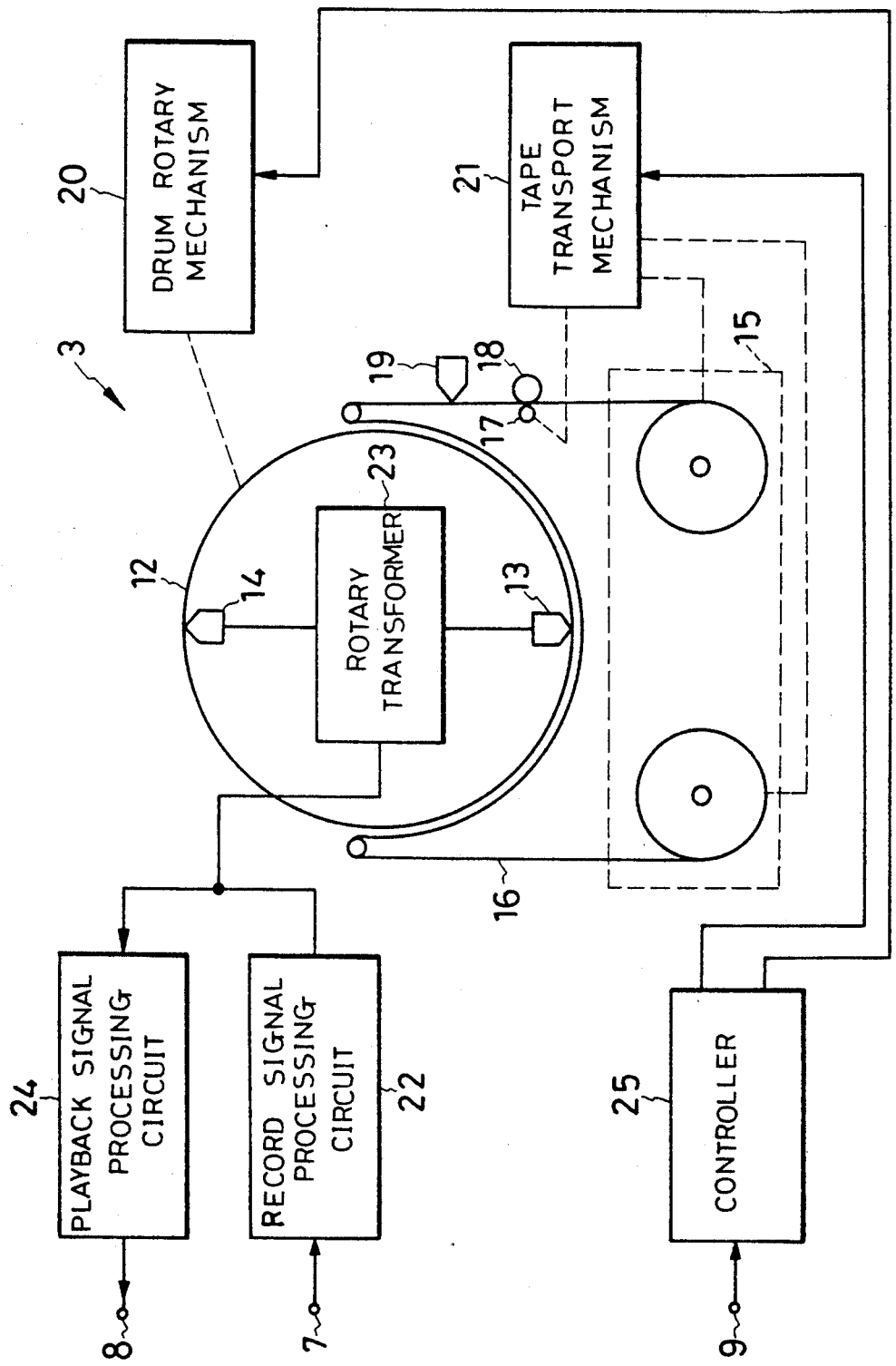
FIG. 2 is a block diagram showing a principle of the video tape recorder shown in FIG. 1.

FIG. 2 depicts a basic construction of the VTR 3. The VTR 3 has a rotary drum 12 and a pair of transducers or magnetic heads 13 and 14, these transducers rotating together with the rotary drum 12. The magnetic tape 16 contained in the video tape cassette 15 is wound slantly around the drum 12. A capstan 17, a pinch roller 18, and an audio head 19 are arranged along a transport or travel route of the tape 16.

The drum rotary mechanism 20 operatively connected to the drum 12 rotates the drum 12 and the pair of transducers 13, 14 and the tape transport mechanism 21 functionally connected to the tape cassette 15 and the capstan 17 enables to travel the tape 16, so that slant tracks are formed on the tape 16.

The record signal input terminal 7 is connected to the pair of transducers 13, 14 through a record signal processing circuit 22 and a rotary transformer 23. Also, these transducers 13, 14 are connected to the reproduction signal output terminal 8 through the rotary transformer 23 and the playback signal processing circuit 24. These drum rotary mechanism 20 and the tape transport mechanism 21 are connected to a controller 25. The controller 25 is connected to the remote control terminal 9 and a record switch, a playback or reproduction switch, a pause switch, a stop switch (respectively not shown).

As shown in FIG. 1, the record and playback control circuit apparatus 2 includes a record setting switch 5, a playback setting switch 6, a record-playback selection switch 27, a memory means 28, a microprocessor or microcomputer 29, a timing signal extraction circuit 30, a timing signal generation circuit 31, a mixer 32, and an input selection switch 33 of the VTR 3.

Practically, the record-playback selection switch 27 is an electronic switch, however, it is shown by a stable contact R for selecting the records, another stable contact P for selecting the playback or reproduction, and a movable contact M so as to make understanding the selection switch 27 easy.

The stable contact R is connected to the video camera 1 through a terminal 34 and a line 4. The stable contact P is connected to the playback output terminal 8 of the VTR 3 through the terminal 35. The movable contact M is connected to the memory means 28, the timing signal extraction circuit 30, and a stable contact b of the VTR input selection switch 33. The memory means 28 consists of an analog-digital converter 36 (hereinafter referred to as ADC), the first and the second switches 37 and 38, the first and the second frame memories 39 and 40, and a digital-analog converter 41 (hereinafter referred to as DAC).

The ADC 36 is connected to the movable contact M of the record-playback selection switch 27 and it converts composite picture signal or continuous frames received through the input terminal 34 and an output signal from the VTR 3 to digital signals.

The first and the second switches 37 and 38 connected between the ADC 36 and the first and the second frame memories 39, 40 are controlled by the microprocessor 29 so as to selectively shut-down the input to the first and the second frame memories 39, 40.

The first and the second frame memories 39 and 40, respectively has functions for memorizing one frame part of the composite picture signal converted to a digital signal through the ADC 36. An output of the first frame memory 39 is connected to the DAC 41. An output of the second frame memory 40 is connected to the microprocessor 29 as shown in FIG. 1.

The DAC 41 converts the composite picture signal digitalized to an analog composite picture signal.

The mixer 32 is connected to the DAC 41 and the timing signal generation circuit 31 in order to add timing signals to vertical blanking period of the composite picture signals.

The VTR input selection switch 33 of electronics type is shown in FIG. 1 as one having two stable contacts a, b and a movable contact c. The stable contact a is connected to the mixer 32 and the stable contact b is connected to the movable contact M of the record-playback selection switch 27, and another movable contact c is connected to the record signal input terminal 7 of the VTR 3, as well as to a TV monitor 44 through a terminal 43.

It is apparent that the microprocessor 29 comprises a Central Processing Unit (CPU), Read Only Memories (ROM), Random Access Memories (RAM), an interface, and an input and an output ports. A plurality of lines 45, 46, 47, 48, 49, 50, 51, 52, 53, 54, 55, 57 and 58 are connected to the microprocessor 29. The line 45 is connected to a playback setting switch 6 and line 46 is to a record setting switch 5. The line 47 is connected to the record-reproduction switch 27, line 48 is to the first switch 37, and line 49 is to the second switch 38. The lines 50 and 51 are connected to the second frame memory 40 and line 52 is to the first frame memory 39. The line 53 is connected to the VTR input selection switch 33. The line 54 is connected to the remote control terminal 9 of the VTR 3 through a terminal 62 in order to supply record control signals, reproduction or playback control signals, pause control signals, and stop control signals. The line 55 is connected to a manual mode setting switch 10 and line 57 is to the timing signal generation circuit 31. The line 58 is connected to the timing signal extraction circuit 30.

Figure 3:
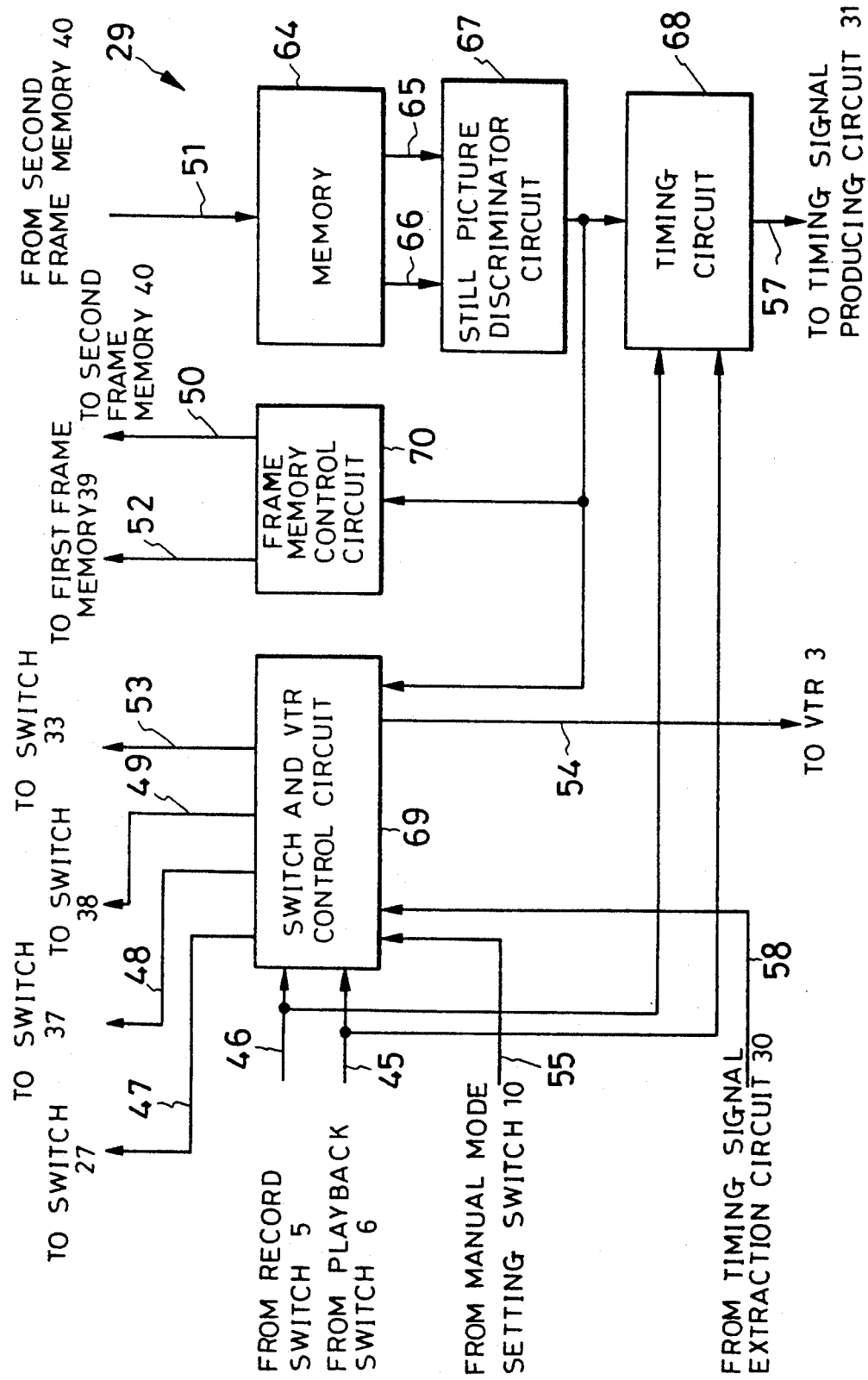
FIG. 3 is a block diagram showing functional features of a microprocessor of FIG. 1.

FIG. 3 shows an equivalent circuit of the microprocessor 29 depicted in FIG. 1 and it is used to easily understand the construction and function of the microprocessor 29. It is explicit that the microprocessor 29 has a memory 64 in which the contents of the second frame memory 40 are written. The memory 64 is connected to the second frame memory 40 through the line 51 in order to write part of the output data from the second frame memory 40 every a predetermined time length (0.5 sec).

A still picture judgement circuit or still picture discriminator circuit 67 is connected to the memory 64 through the lines 65 and 66.

The still picture judgement circuit 67 compares the signal inputted thereto from the line 65 so as to show the frame (hereinafter referred to as former frame) which previously or had been written in the memory 64 and another signal showing the frame (hereinafter referred to as latter frame) which has been written in the memory 64 later than the former frame by 0.5 sec so as to determine or judge whether both the frames are substantially identical with each other.

According to the preferred embodiment of the present invention, all data of the former frame and the latter frame aren't compared, but a predetermined number of data selected from the former frame and a predetermined number of data from the latter frame are compared to each other in the still picture discriminator circuit 67. The predetermined number of data extracted from the former frame and the predetermined number of data from the latter frame are the data of the same position in both frames. The number of data to be extracted from the former and the latter frames are selected from the range of about 100–10000. It about in the preferred embodiment.

Next, the still picture discriminator circuit 67 outputs signals showing whether the former frame is substantially identical with the latter frame which is later than the former one by 0.5 sec. When the former frame is substantially identical with the latter frame, it means that the video camera 1 is taking a still picture. On the contrary, when both the frames are differed from each other, it means the video camera 1 is shooting motion pictures.

The timing circuit 68 connected to the still picture discriminator circuit 67 measures a time length in which the signals from the still picture discriminator circuit 67 indicate that the video camera 1 is taking a still picture. Then, the timing circuit 68 outputs a signal indicating the time length in which the video camera 1 is shooting a still picture. The signal indicating the time length is supplied to the timing signal generation circuit 31 shown in FIG. 1 through the line 57.

It is apparent that the switching and VTR control circuit 69 is connected to the still picture judgement circuit 67 and various lines 45, 46, 47, 48, 49, 53, 54, 55 and 58.

A frame memory control circuit 70 is connected to the still picture discriminator circuit 67 and lines 50, 52.

Figure 4:
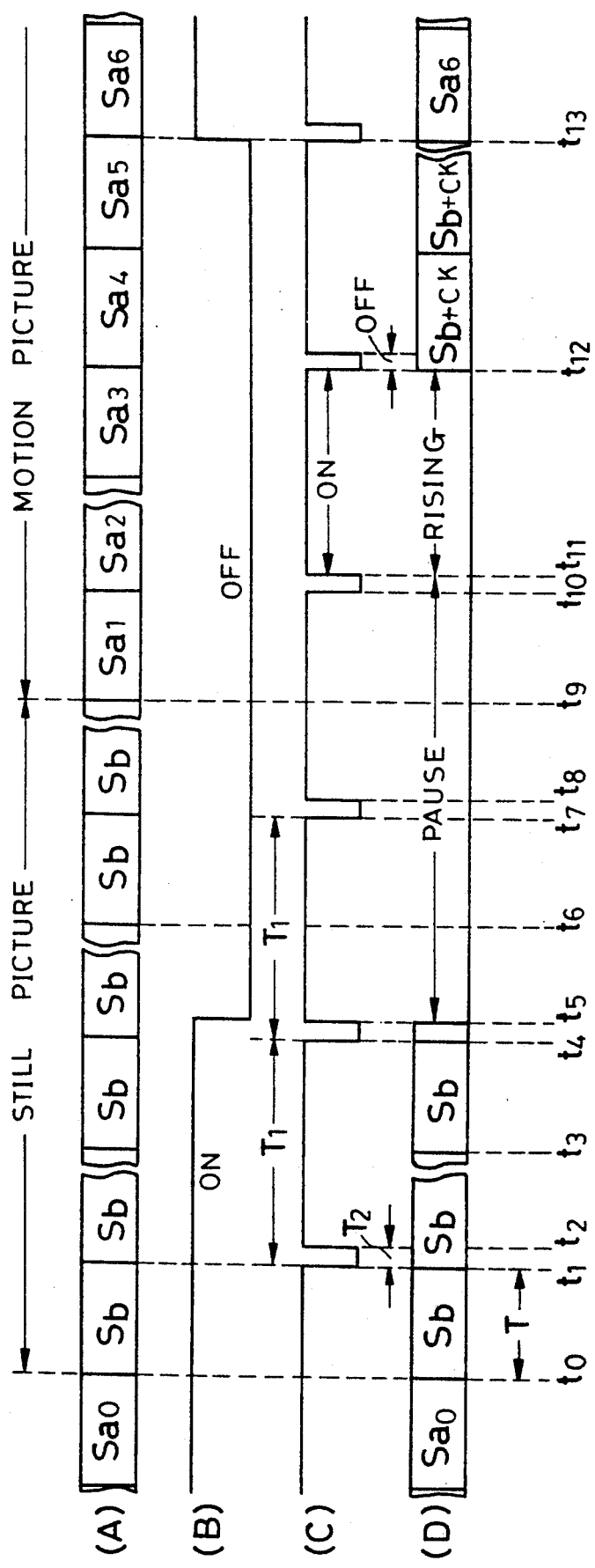
FIG. 4(A)-(D), are timing diagrams showing a received input signal of FIG. 1, ON and OFF of the first and the second switches, and an arrangement of frames recorded on magnetic tapes.

The record and playback system shown in FIG. 1 functions according to the timing chart showing frame trains (A), (B), (C) and (D) of FIG. 4.

When the record setting switch 5 is turned ON, the switch and VTR control circuit shown in FIG. 3 responds to the signal showing a record mode of the line 46 and sends control signals for the switches 27, 37, 38 and 33 to the lines 47, 48, 49 and 53, as well as supplies control signals for the VTR 3 to the line 54. When the movable contact M of the record playback selection switch 27 contacts with the stable contact R of the switch 27, successive frames of the composite picture signal shown in FIG. 4 (A) and generated in the video camera 1 are outputted to the memory means 28 shown in FIG. 1.

As shown in FIG. 4(A), the frames having motion picture information are these frames Sa0, Sa1, Sa2, Sa3, Sa4, Sa5 and Sa6 and the frames having still picture information are these frames Sb. Respective frames are received with the period or cycle T (1/30 sec). The vertical synchronizing pulses and horizontal synchronizing pulses to be contained in the composite picture signal are not shown in FIG. 4(A).

If the output line 4 of the video camera 1 is connected to the input terminal 7 of the VTR 3, all continuous frames shown in FIG. 4(A) are recorded on the magnetic tape 16. However, when the control circuit apparatus 2 is connected between the video camera 1 and the VTR 3, some frames shown in FIG. 4(A) are partly recorded on the magnetic tape 16.

Concerning FIG. 4(C), the second switch 38 is controlled to be turned ON and OFF with the predetermined period $T_1$, which values of the predetermined period $T_1$ are in the range of 1/30 sec through 20 sec, and preferably of 0.1 sec through 10 sec. In the preferred embodiment of the present invention, it is 0.5 sec. During the OFF period $T_2$ (about 0.01 sec) of the second switch 38, recording of the digitized composite picture signal in the second frame memory 40 is interrupted. As a result, in the OFF period $T_2$ of the second switch 38, the second frame memory 40 becomes frozen. The frame data written in the second memory frame 40 in the period T ($t_0$-$t_1$) just before the OFF period $T_2$ ($t_1$-$t_2$) are transferred to the memory 64 of the microprocessor 29 through the line 51.

When the second switch 38 is turned ON at the instant $t_2$, a writting of the frame data into the second frame memory 40 starts.

When the second switch 38 turns OFF again in the period $t_4$-$t_5$ after the frame Sb of $t_3$-$t_4$ is written in the second frame memory 40, the data of the frame Sb of $t_3$-$t_4$ are transferred from the second frame memory 40 to the memory 64 of the microprocessor 29. The still picture discriminator circuit 67 compares the data of the frame of $t_0$-$t_1$ immediately before the first OFF period: $t_1$-$t_2$ with the data of the frame: $t_3$-$t_4$ immediately before the second OFF period $t_4$-$t_5$ in order to judge whether both frames of data are substantially identical or not.

With reference to FIG. 4, the data of the former frame of $t_0$-$t_1$ and that of the latter frame of $t_3$-$t_4$ are Sb respectively and identical to each other, so that the still picture discriminator circuit 67 outputs the signal showing that the still pictures are being received. For example, the signal showing the still picture is produced at $t_5$, the first switch 37 is transferred to its OFF condition. Consequently, data of the frame of $t_3$-$t_4$ just before the instant $t_5$ is stored in the first frame memory 39.

Until the instant $t_5$, the movable contact c of the VTR input selection switch 33 contacts to the stable contact b. Consequently, until the instant above, the frames as shown as a frame train in FIG. 4(A) are supplied to the VTR 3 as they are. However, when the signal showing the still picture is produced at the instant $t_5$, the movable contact c of the VTR input selection switch 33 leaves from the stable contact b and touches another contact a. As a result, the supply of the successive frames or frame train shown in FIG. 4(A) to the VTR 3 is interrupted. At the instant $t_5$, a pause control signal is supplied from the microprocessor 29 to the remote control terminal 9 of the VTR 3.

The controller 25 shown in FIG. 2 responds to the pause control signal controlling the tape travel mechanism 21 so as to stop the travelling magnetic tape 19.

During a period $t_7$-$t_8$, data written in the memory 64 of the microprocessor 29 are that of the frame of $t_6$-$t_7$ shown in FIG. 4(A) and are identical with data of the frame: $t_3$-$t_4$, so that the still picture discriminator circuit 67 again outputs the signal showing the still picture.

Concerning FIG. 4(A), in the period $t_0$-$t_9$, a number of frames Sb having the same content of a still picture are placed and, in the other period after $t_9$, different or various content frames Sa1-Sa6 are placed. That is the frame Sa1 of $t_9$-$t_{10}$ just before the instant $t_{10}$ is differed from the frame Sb ($t_6$-$t_7$) just before $t_7$. As a result, the output signal showing that the picture is motion ones, not still ones is generated from the still picture discriminator circuit 67 at the instant $t_{11}$.

The switching and VTR control circuit 69 shown in FIG. 3 sends a signal showing pause cancellation or record instruction to the line 54, in response to the motion picture signal outputted from the still picture discriminator circuit 67 as described above.

The VTR controller 25 shown in FIG. 2 controls the tape travel apparatus 21 so as to respond to the pause cancellation signal from the remote control terminal 9 starting a tape running or travelling.

Thus, the tape 16 starts its normal travel with a delay time of $t_{11}$-$t_{12}$.

The timing circuit 68 shown in FIG. 3 measures or counts a time length in which the still picture frames Sb are received based on the output of the still picture discriminator circuit 67.

According to the preferred embodiment, the signal showing $(N+1) \times T_1$ is outputted from the timing circuit 68. In the formula, N is a numeral not less than 1.

The output of the timing circuit 68 is sent to the timing signal generation circuit 31 shown in FIG. 1 through the line 57. The circuit 31 outputs timing signals CK adjusted in timing so as to be placed in a vertical blanking period of the composite picture signal outputted from the DAC 41. The mixer 32 adds the timing signal CK obtained from the timing signal generation circuit 31 to the vertical blanking period of the composite picture signal obtained from the DAC 41. A content of the timing signal CK is corresponding to the output of the timing circuit 68 or the time length $(N+1) \times T_1$.

The data of the still picture frame Sb stored in the first frame memory 39 is readout several times (for example 15) repeatedly in the period of $t_{12}$ through $t_{13}$ shown in FIG. 4. The data thus readout are converted to analog signals in the DAC 41. The composite picture signal obtained from the DAC 41 is sent to the input terminal 7 of the VTR 3 together with the timing signal CK mentioned above. As a result, as shown in FIG. 4(D), in the period: $t_{12}$-$t_{13}$, mixed signals Sb+CK of a still picture frame Sb and a timing signal CK are recorded on the magnetic tape 16. In principle, it is enough to record only one frame of the mixed signal Sb+CK. However, in order to make sure to record and playback the mixed signal Sb+CK, several mixed signals Sb+CK in a time length of, for example, 0.5-10 seconds are preferably recorded on the magnetic tape 16.

At the instant $t_{13}$, the microprocessor 29 makes the movable contact c of the switch 33 contact the stable contact b. Accordingly, the continuous frames or a train of frames shown in FIG. 4(A) are supplied to the VTR 3.

As apparent from a comparison between FIG. 4(A) and FIG. 4(D), all information (picture and frame number) of a number of still picture frames contained in the period: $t_0$-$t_9$ shown in FIG. 4(A) are contained in the period: $t_{12}$-$t_{13}$ of FIG. 4(D). Because the time length of the period: $t_{12}$-$t_{13}$ is shorter than that of the period: $t_0$-$t_9$, the volume or length of the magnetic tape 16 to be used to record the composite picture signal thereon can decrease. In other words, a fixed volume of the magnetic tape 19 can record more information than usual.

In order to obtain playback signals from the magnetic tape 16 on which picture information is recorded as shown in FIG. 4(D), it is necessary to turn the playback setting switch 6 ON. Thus, the VTR 3 is controlled by the microprocessor 29, and a travel of the magnetic tape 16 and rotation of the transducers 13, 14 start. Simultaneously, the switching and VTR control circuit 69 of the microprocessor 29 controls so as to make the movable contact M of the switch 27 contact the stable contact P. In addition, the microprocessor 29 makes the first switch 37 ON in response to the playback command signal and controls the second switch 38 as shown by FIG. 4(C).

In a playback mode of the system for recording picture signals, the microprocessor 29 repeatedly outputs the data memorized in the second frame memory 40 at an interval $T_1$, similar to the case of a recording mode, so as to compare the frame formerly readout to another frame subsequently readout and judge whether both frames are substantially identical. When both frames are not substantially the same, the frame memorized in the first frame memory 39 is immediately readout and it is converted to an analog signal through the DAC 41. The analog signal or the output of the DAC 41 is sent to the monitor 44 through the switch 33 and the terminal 43.

When the microprocessor 29 judges or determines that the former frame and the latter frame are the same, the first switch 37 is turned OFF and the first frame memory 39 is frozen. Then, the frame memorized in the first frame memory 39 is repeatedly readout and a display (picture) corresponding to the frame above is shown in the monitor 44.

Next, the mixed signal Sb+CK shown in the period $t_{12}$-$t_{13}$ of FIG. 4(D) is played back or reproduced. As a result, the timing signal CK is extracted by the timing signal extraction circuit 30 shown in FIG. 1.

The microprocessor 29 controls a freeze time of the first frame memory 39 in response to the timing signal CK extracted. That is, the data memorized in the first frame memory 39 is readout repeatedly only for the time duration determined by the timing signal CK. In short, the data in the first frame memory 39 is repeatedly readout so as to arrange a still picture frame Sb is the period of $t_4$-$t_{12}$ in FIG. 4(D).

Because the number of data or frames repeatedly readout from the first frame memory 39 are perfectly the same, it is possible to display a still picture without or with less jitter on the monitor 44.

The microprocessor 29 gives a pause control signal to the remote control terminal 9 of the VTR 3 in synchronization with a start of time length designated by the timing signal CK. If the time length is sufficiently long, the microprocessor 29 gives a stop control signal to the remote control terminal 9 of the VTR 3. Then, in synchronization of a finish of the time length designated by the timing signal CK, the microprocessor 29 gives a playback start control signal to the remote control terminal 9 of the VTR 3. Until the magnetic tape 16 attains its ordinal running condition, the first frame 39 is kept at its freeze condition. After the first frame memory 39 is released from its freeze condition, the picture corresponding to the playback output of the VTR 3 is given on the monitor 44.

Another usage method of the record and playback system of FIG. 1 will be explained.

When a signal for indicating a manual mode is given to the microprocessor 29 by operation of the manual mode setting switch 10, the microprocessor 29 makes the movable contact C of the VTR input selection switch 33 contact the stable contact a.

Simultaneously, the microprocessor 29 controls the first switch 37 turning ON. As a result, data corresponding to the output signal from the video camera 1 are written in the first frame memory 39, then the data are readout, and the composite image signal corresponding to the data is recorded in the magnetic tape 16.

In the condition of a manual mode setting, when a record instruction signal owing to an operation of the record switch 5 is given to the microprocessor 29, the microprocessor 29 makes the switch 37 its OFF condition and at the same time sends a pause control signal to the remote control terminal 9 of the VTR 3. Consequently, at the instant $t_5$ shown in FIG. 4, the first frame memory 39 becomes of a freeze condition and simultaneously the VTR 3 becomes of a pause condition.

When the record switch 5 is again operated after any or predetermined time length is elapsed from the instant of the first operation of the record switch 5, the microprocessor 29 responds to the output signal from the record switch 5, gives a signal instructing a record start to the remote control terminal 9 of the VTR 3, and also gives a data readout command to the first frame memory 39. Simultaneously, the timing circuit 68 of the microprocessor 29 measures the time length from the first operation of the record switch 5 to its second operation and outputs a timing signal indicating the time length.

As a result, the timing signal corresponding to the output signal of the timing circuit 68 is mixed or added to the composite picture signal corresponding to the data in the frame memory 39 in the mixer 32. The mixed signal obtained from the mixer 32 during a period of the predetermined time (for example, 0.5-10 sec) is recorded on the magnetic tape 16. When the recording of the mixed signal for the predetermined time finishes, the microprocessor 29 controls the switch 37 turning it ON. Consequently, recording of the signal corresponding to the output signal from the video camera 1 on the magnetic tape 16 starts.

By the way, it is possible to make the VTR 3 of a pause condition after completion of the recording of the mixed signal for the predetermined time.

It is possible also to reproduce one frame of the successive frames obtained by the video camera 1 on the monitor 44 as a still picture owing to the magnetic tape on which picture information is manually recorded.

Figure 5:
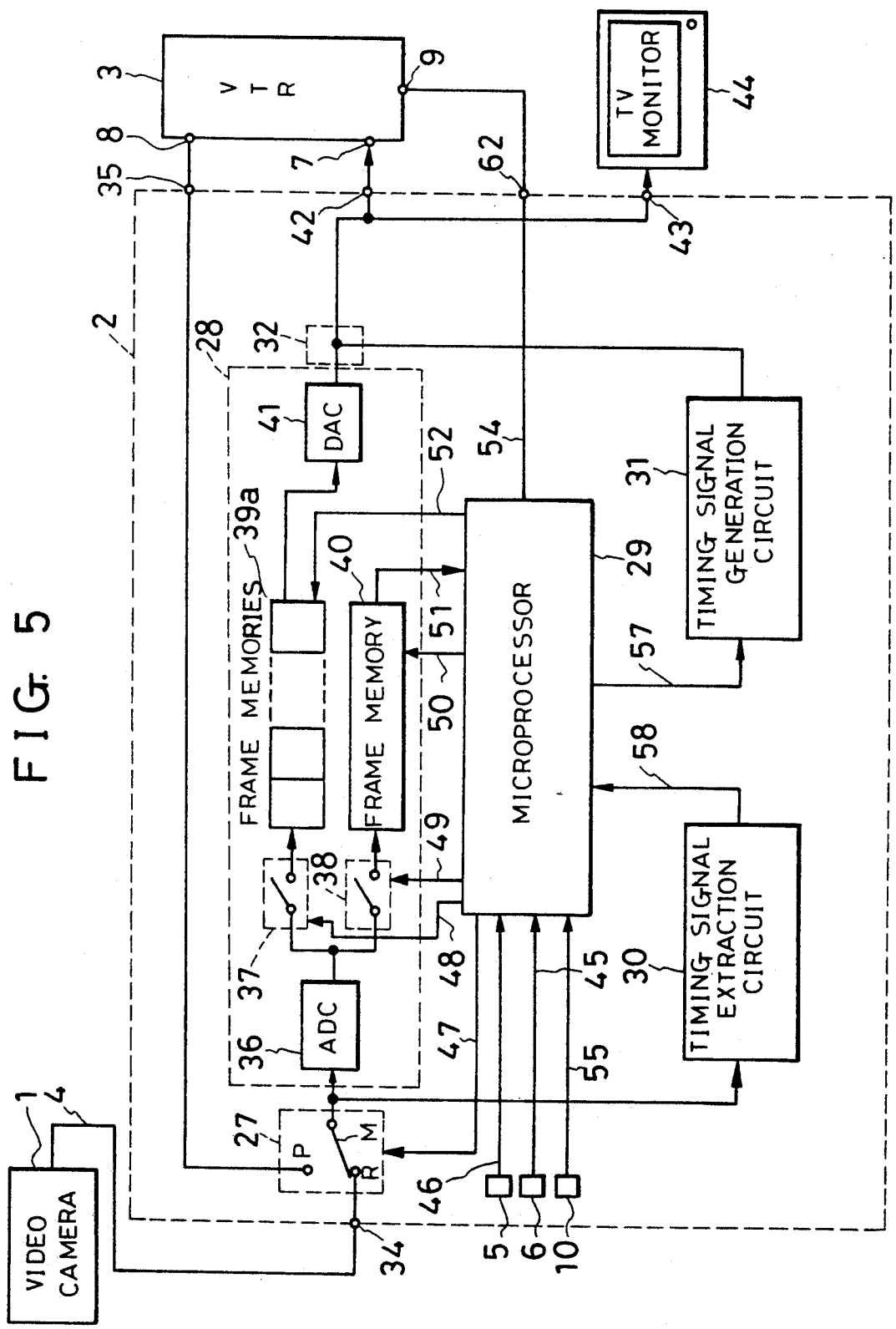
FIG. 5 is a block diagram showing the picture signal record and reproduction system according to the second preferred embodiment of the present invention.

FIG. 5 depicts the record and playback system concerning the second embodiment of the present invention shown in FIG. 5. The majority portion of the record and playback system of FIG. 5 is identical with that of the record and playback system shown in FIG. 1, so that respective systems function in the same manner described above. Consequently, the corresponding portions and members of both record and playback system have the same reference numerals and explanations for them are omitted.

The system shown in FIG. 5 has a group of frame memories 39a in place of the first frame memory 39 of the system shown in FIG. 1. The group of frame memories 39a consists of a plurality of (for example, 30) frame memories respectively connected in series and operates as a shift register. It is noted that the system of FIG. 5 doesn't have anything corresponding to the VTR input selection switch 33 shown in FIG. 1. Both the still picture frames and motion picture frames are accordingly supplied to the VTR 3 through the frame memories group 39a.

FIG. 6(A), (B), (C) and (D), similar to FIG. 4(A), (B), (C) and (D), respectively show input signals of the record and playback system, ON-OFF condition of the first switch 37, ON-OFF condition of the second switch 38 and operative condition of the VTR 3. The general portion of FIG. 6(A)-(D) is identical with that of FIG. 4(A)-(D). FIG. 6 is differed from FIG. 4 in the following points that the first switch 37 is as shown in FIG. 6(B) controlled to its ON condition at the instant $t_{11}$ and the frame Sa2 is recorded on the magnetic tape 16 during the period: $t_{13}$-$t_{14}$ as shown in FIG. 6(D).

When the frame memory group 39a of the system shown in FIG. 5 is controlled to its freeze condition at the instant $t_5$, a plurality of frames (for example, 30 frames) just before the instant $t_5$ are stored in the frame memory group 39a.

Then, the first switch 37 is made of ON condition when a judgement result is obtained, which indicating that the latter frame is not identical with the former frame at $t_{11}$, in other words, the still picture of the former frame changes to a motion picture in the latter frames, then the data of the frame memories group 39a is sequentially readout.

When an ordinal running of the magnetic tape 16 of the VTR 3 starts at the instant $t_{12}$, a mixed signal Sb+CK readout from the frame memory group 39a starts to be recorded on the magnetic tape 16.

Similar to a function of a shift register, the frame memories group 39a are sent out sequentially a plurality of frames stored in the frame memories. After all the mixed signals Sb+CK being sent out from the group of frame memories 39a at the instant $t_{13}$, successive frames Sa2, Sa3, Sa4 . . . after the instant $t_{11}$ of FIG. 6(A) are sent out from the group of frame memories 39a to the VTR 3.

According to the system shown in FIG. 5, it is possible to lessen a lack of the frames showing motion picture.

Although I have shown and described my invention in very specific aspects thereof, I do not wish my invention to be limited by the exact details of the foregoing disclosure. The following is a brief list of possible modifications or alterations of the above disclosed embodiment that will occur to those skilled in the art without departing from the scope of my invention:

1. It is possible to integrate the first and the second switches 37 and 38, and the first and the second frame memories 39 and 40, respectively into a unit. That is, it is possible to omit these switches 37 and 38 by using frame memories provided with write-enable terminals in place of the frame memories 39 and 40.

2. It is possible to connect a VTR or a video disc player or a TV receiver, in place of the video camera 1, to the input terminal 34.

3. The video camera 1 enables to be replaced by another video camera for sending digital picture data. The VTR 3 enables to be replaced by another VTR for recording digital picture data.

4. The VTR 3 enables to be replaced by a video disc record and playback apparatus.

5. It is possible to record timing signals CK on audio trackes on the magnetic tape 16 by means of an audio head 19.

6. The VTR 3 can be stopped in place of be paused at the instant $t_5$ shown in FIGS. 4 and 6.

7. It is possible to use field memories for storing one field data of the composite picture signal in place of the frame memories 39 and 40.

8. It is possible to write a mixed signal of a picture signal and an audio signal on the first and the second frame memories 39 and 40.

What is claimed is:

1. A recording process of a picture signal including a plurality of frames on a record medium, comprising the steps of:
 (a) providing a memory means;
 (b) receiving each frame of the plurality of frames successively;
 (c) sampling the successive frames so received at predetermined intervals;
 (d) comparing a first frame of the successive frames so sampled with a second subsequent frame of the successive frames so sampled to determine whether the second frame is substantially identical with the first fame;
 (e) recording the successive frames on the record medium, when the second frame is not substantially identical with the first frame;
 (f) halting said recording of the successive frames on the record medium and writing one of the first and second frames on said memory means, when the second frame is substantially identical with the first frame, the frame so written defining a stored frame;
 (g) reading the stored frame from said memory means and writing the frame so read on the record medium when a frame successive to the stored frame is not substantially identical with the stored frame, and then further writing successive frames so received on the record medium according to steps (e) and (f);

(h) producing a timing signal indicative of a time length in which said recording is halted according to step (f); and (i) recording the timing signal on the record medium.

2. The recording process according to claim 1, wherein the predetermined interval is 1/30 sec-20 sec.

3. The recording process according to claim 1, wherein said memory means provides an output signal having a vertical blanking period, the process further comprising the step of:

adding the timing signal to the output signal in the vertical blanking period.

4. A recording process of a composite picture signal including a plurality of frames on a magnetic tape through a video tape recorder, comprising the steps of (a) providing a memory means;

(b) receiving each frame of the plurality of frames successively;

(c) sampling the successive frames at predetermined intervals;

(d) comparing a first frame of the successive frames so sampled with a second subsequent frame of the successive frames so sampled to determine whether the second frame is substantially identical with the first frame;

(e) recording successive frames so received on the magnetic tape, when the second frame is not substantially identical with the first frame;

(f) halting said recording of the successive frames on the magnetic tape and writing one of the first and second frames on said memory means, when the second frame is substantially identical with the first frame, the frame so written defining a stored frame;

(g) reading the stored frame from said memory means and writing the frame so read on the magnetic tape when a frame successive to the stored frame is not substantially identical with the stored frame, and then writing successive frames on the magnetic tape according to steps (e) and (f);

(h) producing a timing signal indicative of a time length in which said recording is halted according to step (f); and (i) recording the still picture timing signal on the magnetic tape.

5. The recording process according to claim 4, wherein said memory means provides an output signal having a vertical blanking period, the process further comprising the step of:

adding the timing signal to the output signal in the vertical blanking period.

6. A recording process for a picture signal including a plurality of frames using a recording apparatus comprising a record medium, a signal transducer, means for creating relative scanning motion between said record medium and said signal transducer, comprising the steps of:

(a) providing a memory means and a timing signal producing means;

(b) receiving each frame of the plurality of frames successively;

(c) successively writing the frames so received on said memory means;

(d) halting the successive writing of the frames on said memory means, whereby a frame written on said memory means at the time the successive writing is halted defines a stored frame;

(e) substantially disabling the means for creating the relative scanning motion when the successive writing of the frames is so halted;

(f) producing a timing signal indicative of the time the means for creating the relative scanning motion is substantially disabled;

(g) reading the stored frame from said memory means; and (h) recording the timing signal and said frame read-out from the memory means on the record medium.

7. The recording process according to claim 6, wherein said frame read-out from the memory means includes a vertical blanking period, the process further comprising the step of:

adding the timing signal in the vertical blanking period.

8. A recording system for recording a picture signal including a plurality of frames on a record medium, comprising:

(a) transducer means for recording said picture signal on the record medium;

(b) means for creating relative scanning motion between said record medium and said transducer means;

(c) record signal processing circuit connected to said transducer means;

(d) input means for receiving each frame of the plurality of frames successively;

(e) memory means connected to said input means for storing at least one of the successive frames received by the input means;

(f) selection means connected to said memory means, said input means and said record signal processing circuit, for selecting an output from one of said memory means and said input means, and for supplying the output so selected to said record signal processing circuit;

(g) discriminator means for determining whether a first successive frame received by said input means and a second subsequent successive frame received by said input means are substantially identical to each other;

(h) control means connected to said memory means, the selection means, the discriminator means, and the means for creating the relative scanning motion, for controlling the memory means so that the successive frames of said picture signal stored in the memory means are output at a predetermined interval, for controlling the means for creating the relative scanning motion so as to halt a recording motion of the picture signal on the record medium by said transducer means if the second successive frame is substantially identical to the first successive frame as determined by the discriminator means, for controlling the means for creating the relative scanning motion causing the picture signal to be recorded on the record medium by said transducer means if the second successive frame is not substantially identical with the first successive frame as determined by the discriminator means, for controlling said memory means so as to output one of the first successive frame and one other subsequent successive frame being substantially identical with the first successive frame from the memory means, for controlling the selection means so as to supply the output of said memory means to said record signal processing circuit in a predetermined time length, and for further controlling the selection means so a to output the picture signal received to said record signal processing circuit;

(i) timing signal producing means connected to the control means for producing a timing signal indicative of a time length in which said control means halts the recording of the picture signal; and (j) mixing means connected to said memory means and said timing signal producing means for adding the timing signal to the output of said memory means.

9. The recording system for recording a picture signal according to claim 8, wherein the output of the memory means includes a vertical blanking period, the mixing means adding the timing signal in the vertical blanking period.

10. The recording system according to claim 8, wherein said memory means comprises:
   (a) an analog-digital convertor connected to said input means;
   (b) a first and a second frame memories;
   (c) a first and a second switches respectively connected between said analog-digital convertor and the first and the second frame memories; and
   (d) a digital-analog convertor connected to said first frame memory.

11. A recording system for recording a picture signal including a plurality of frames on a record medium, comprising:
   (a) transducer means for recording said picture signal on the record medium;
   (b) means for creating relative scanning motion between said record medium and said transducer means;
   (c) a record signal processing circuit connected to said transducer means;
   (d) input means for receiving each frame of the plurality of frames successively;
   (e) first memory means connected to said input means for storing at least one of the successive frames received by the input means;
   (f) second memory means connected to said input means for storing at least one of the successive frames received by the input means;
   (g) discriminator means for determining whether a first successive frame received by said input means and a second subsequent successive frame received by said input means are substantially identical to each other;
   (h) control means connected to said first memory means, said second memory means, the discriminator means, and the means for creating the relative scanning motion for controlling said second memory means so that the successive frames of said picture signal stored in said second memory means are output at a predetermined interval, for controlling the means for creating the relative scanning motion so as to halt a recording motion of said picture signal on said record medium by said transducer means if the second successive frame is substantially identical with the first successive frame as determined by the discriminator means;

for controlling the means for creating the relative scanning motion causing the picture signal to be recorded on the record medium by said transducer means if the second successive frame is not substantially identical with the first successive frame as determined by the discriminator means, for causing the first memory means to output one of the first successive frame and one other subsequent successive frame being substantially identical with the first successive frame, for causing the one frame output from the first memory means to be supplied to said record signal processing circuit in a predetermined time length, and for further controlling the first memory means so as to supply said picture signal received in said input means to said record signal processing circuit;

(i) timing signal producing means connected to the control means for producing a timing signal indicative of a time length in which said control means halts the recording of the picture signal; and (j) mixing means connected to said first memory means and said timing signal producing means for adding the timing signal to the output of said first memory means.

* * * * *